United States Patent [19]

Button

[11] 4,015,877
[45] Apr. 5, 1977

[54] VEHICLE SEAT ASSEMBLIES
[75] Inventor: John Charles Gladstone Button, Warwick, England
[73] Assignee: Chrysler United Kingdom Limited, London, England
[22] Filed: Mar. 3, 1975
[21] Appl. No.: 554,670
[30] Foreign Application Priority Data
  Mar. 7, 1974  United Kingdom ............ 10337/74
[52] U.S. Cl. .............................. 297/341; 296/65 R
[51] Int. Cl.² ......................................... B60N 1/04
[58] Field of Search ................... 296/65 R; 297/341
[56] References Cited
UNITED STATES PATENTS

| | | | |
|---|---|---|---|
| 2,160,015 | 5/1939 | Haberstump | 297/341 |
| 2,795,265 | 6/1957 | Albrecht | 297/341 |
| 2,826,241 | 3/1958 | Himka | 297/341 |
| 2,856,983 | 10/1958 | Probst et al. | 297/341 |
| 3,814,476 | 6/1974 | Abbott | 297/341 X |
| 3,860,283 | 1/1975 | Colautti | 296/65 R |
| 3,890,001 | 6/1975 | Turner | 297/341 |

Primary Examiner—Robert J. Spar
Assistant Examiner—Donald W. Underwood
Attorney, Agent, or Firm—Edward F. Connors

[57] ABSTRACT

A vehicle seat assembly is mounted for fore and aft adjustment on slides. A separate slideway extends parallel to the slides and a slide element is lockable at spaced positions along the slideway. The seat has a tilting squab and a lock is provided for locking the sides of the squab. The squab is connected by a pivotal link to the slide element so that, with the squab lock released, the seat is slid forward along its slide by swinging the squab forwardly and with the squab locked and the slide lock released, the seat as a whole can be slid forwardly on its slides.

2 Claims, 4 Drawing Figures

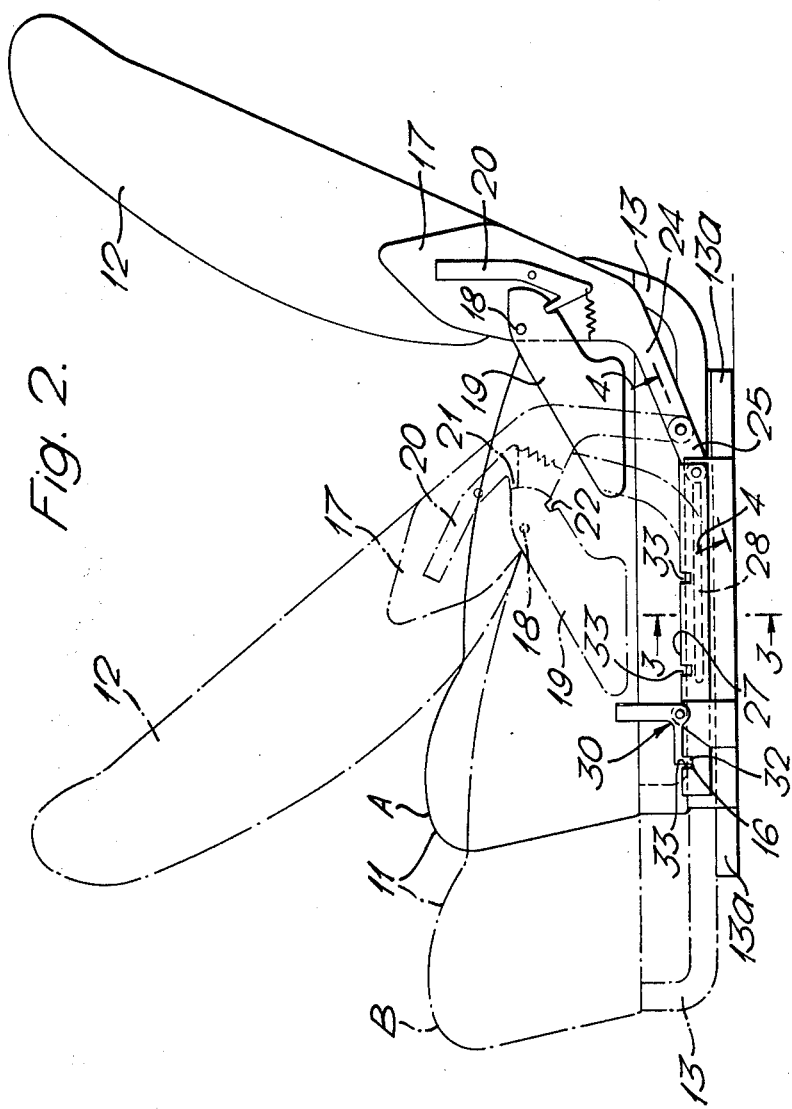

VEHICLE SEAT ASSEMBLIES

This invention relates to vehicle seat assemblies.

The invention provides a vehicle seat assembly comprising a seat, a seat squab pivotably mounted thereon, first locking means to lock the squab against tilting movement with respect to the seat, means to mount the seat for force and aft sliding movement, a slide mounted for movement along a slideway parallel to the fore and aft movement of the seat, second locking means to lock the slide in a plurality of positions of adjustment along the slideway, the squab having an arm extending therefrom towards the slide and means to connect the end of arm to the slide to permit the end of the arm to rise and fall with respect to the slide as the squab is tilted with respect to the seat the arrangement being such that, with the first locking means only released, tilting the squab forwardly over the seat moves the seat forwardly along said mounting means, and, with the second locking means only released, the seat with the squab locked thereto can be adjusted fore and aft on said mounting means.

The connecting means between the end of the arm and the slide may comprise a link pivotally connected at one end to the slide and at the other end to said end of the arm.

The following is a description of a specific embodiment of the invention, reference being made to the accompanying drawings in which:

FIG. 2 is another view in side elevation of the embodiment of FIG. 1 showing the range of movement of the seat assembly with tilting of the seat squab;

Figure 1:
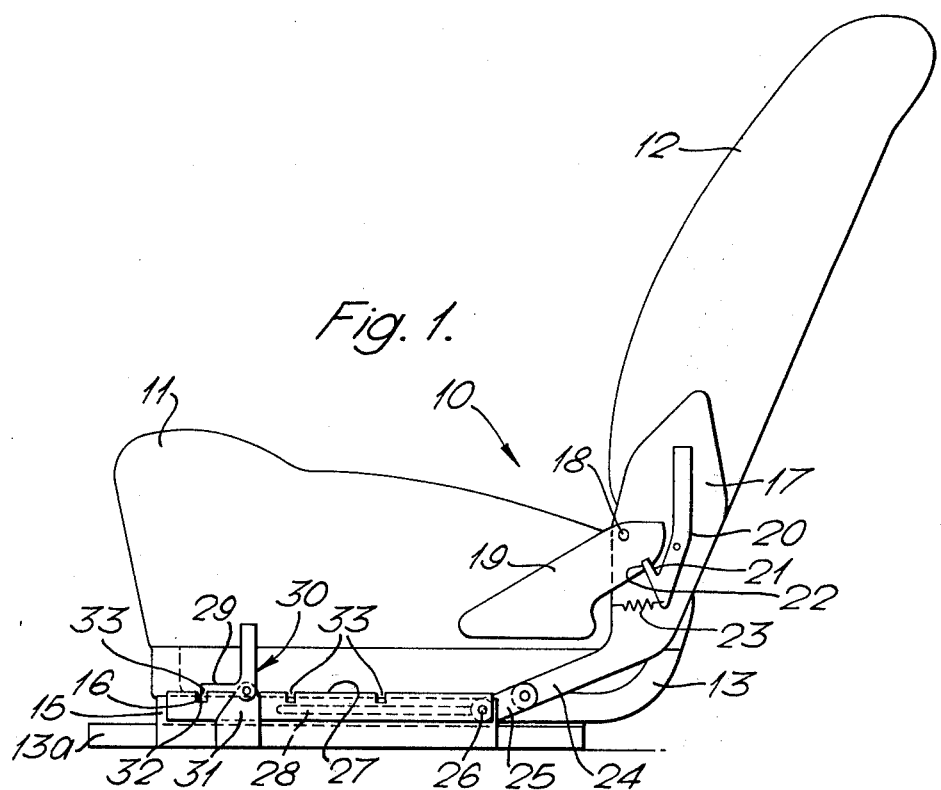
FIG. 1 is a view in side elevation of one embodiment of the invention showing a seat assembly in a rearmost position of adjustment.
Figure 3:
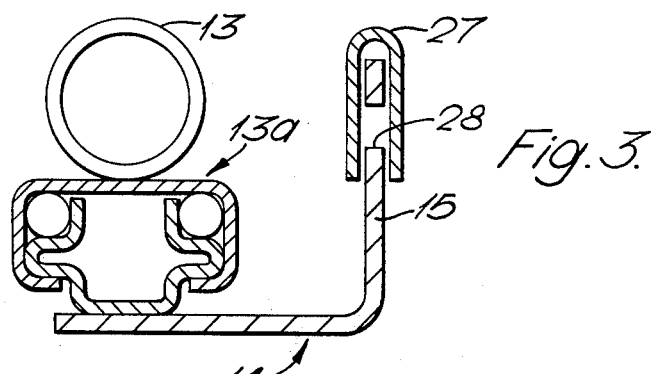
FIG. 3 is a sectional view along the line 3 — 3 in FIG. 2.
Figure 4:
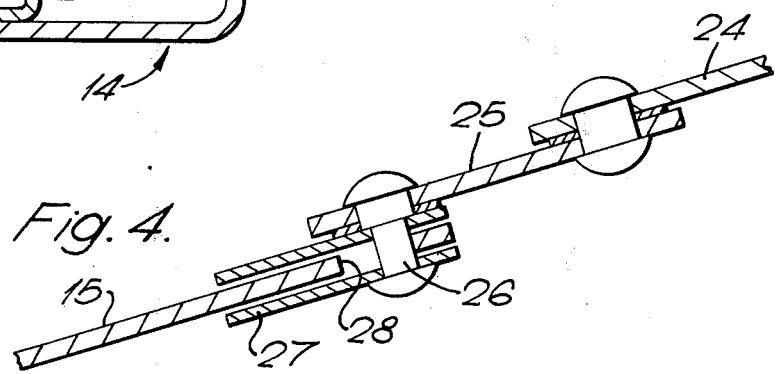
FIG. 4 is a sectional view along the line 4 — 4 in FIG. 2.

The drawings show a motor vehicle front seat assembly indicated generally at 10 including a seat 11 having a forwardly tiltable seatback 12. The seat assembly is particularly suitable for the front seats of a two door car also having a rear seat.

The seat is supported for fore and aft adjustment on spaced apart elongate tubular members 13 which are mounted on conventional fore and aft extending seat slids 13a secured to the vehicle floor (not shown). An elongate L-section plate 14 extends parallel to and alongside one of the slides 13a. One limb of the plate is disposed between the slide and the floor and the other limb projects vertically upwardly above the slide. The upper edge of the vertical limb 15 towards the forward end of the plate has a notch 16 for a purpose to be described later.

Each side of the seatback has a hinge plate 17 secured at the lower end of the seatback. The plates are pivotably mounted at 18 to further plates 19 secured to each side of the frame of the seat cushion adjacent the rear end of the cushion.

A latch lever 20 is pivotably mounted intermediate its ends on one of the plates 17 rearwardly of pivot point 18, the lower end of the lever 20 having a nose 21 which engages in a notch 22 formed in a rear edge of the plate 19. A tension spring 23 is connected between the lower end of the lever 20 and the hinge plate 17 to urge the nose 21 into engagement in the notch 22.

The lower end of the plate 17 is extended below the pivot point 18 to form a forwardly and downwardly directed arm 24, the forward end of which is pivotably connected to one end of a short link 25. The other end of the link 25 is pivotably connected by a pin 26 to the rear end of an inverted U-section elongate seat adjustment member 27 which engages over and is slidable along the vertical limb 15 of the plate 14. The pin 26 passes through a fore and aft extending slot 28 in the vertical limb 15 and is slidable along the slot to permit sliding of the adjustment member 27 along the vertical limb 15 whilst holding the member 27 on the limb.

An L-shaped seat adjustment latch lever 30 is pivotably connected to a bracket 31 secured to the plate 14 towards the forward edge thereof. A downwardly directed tongue 32 on the end of the horizontal arm 29 of the latch lever 30 engages the notch 16 in the top edge of the vertical wall 15 when one of a plurality of spaced apart apertures 33 in the base of the inverted U-shaped adjustment member 27 is in register with the notch 16 such that both the aperture and notch are simultaneously engaged by the tongue 32 to lock the member 27 to the wall 15. A spring (not shown) urges the arm 29 and hence the tongue 32 into the notch 16.

Linear adjustment of the seat 10 in a fore and aft direction is effected by dis-engaging the tongue 32 from the notch 16 and aperture 33 so that the adjustment member 27 is free to slide along the wall 15 when the seat assembly 10 is moved along the slide 13a to a new position in which another selected aperture is in register with notch 16 permitting re-engagement therewith of the tongue 32 on lever 29 to lock the seat assembly against further movement.

The horizontal arm 29 of the lever also serves to prevent lifting of the forward end of the member 27 from the vertical limb 15 of plate 14.

To facilitate entry into the rear seats of a two door vehicle, the seatback release latch lever nose 21 on lever 20 is dis-engaged from notch 22 so that the seatback 12 is free to simultaneously pivot about point 18 and the end of arm 24 pivotably connected to one end of link 25 as described hereinbefore. As the adjustment member 27 is held against sliding movement by the tongue 32 simultaneously engaging in the notch 16 and an aperture 33, pin 26 is a fixed point so that when pressure is applied to the rear top part of the seatback forward movement of the end of the arm 24 is resisted by pin 26 acting through link 25 and the seatback 12 pivots about the end of arm 24 to tilt the seatback forwardly and simultaneously move the seat 11 also forwardly in the slide 13a from position A to position B as shown in FIG. 2.

It will be appreciated that the combined tilting and forward movement of the seatback produces relative movement between the end of arm 24 and the fixed position of pin 26 which is effectively catered for by pivoting of the link 25 about the pin 26 and the end of the arm 24. Thus the link 25 provides a "floating" pivot point for the lower end of the arm 24.

Various modifications may be made to the embodiment described hereinbefore without departing from the scope of the invention. For example either, or both, latching means that is levers 20 and 30 may be operable by remote control mechanisms.

The tilting, adjustment and lacthing means may be duplicated on the other side of the seat assembly and the corresponding pairs of latching means interconnected so that each pair is operable from one side of the seat assembly.

The extension arms 24 on plate 17 may be replaced by a separate arm located on the lower edge of the seatback between the plates 17 and passing through a suitable slot in the rear of the seat so that the end of the arm pivotably connects with link 25 and the adjustment member and wall as before but these are now located below the seat between the seat slides, the seat adjustment latch being connected to a suitable cross shaft for operating the latch from one side of the seat.

Constructional details of the various elements of the arrangement may also be different to those described in the embodiment and illustrated in the drawings.

It is also envisaged that means for adjusting the rake angle of the seatback may also be incorporated in the tilting/sliding seat assembly referred to hereinbefore.

I claim:

1. A vehicle seat assembly comprising a seat, a seat squab pivotally mounter thereon for tilting movement, first locking means for locking the squab against tilting movement with respect to the seat, means to mount the seat for bodily fore and aft sliding movement, a slideway comprising a fixed elongate element extending parallel to the fore and aft direction of movement of the seat, a U-section elongate slide element which receives the fixed element, means between the slide element and the fixed element to constrain the slide element to slide linearly along the fixed element, second locking means for locking the slide element in a selected one of a plurality of positions of adjustment along the fixed element, the squab having an arm with an end extending therefrom towards the slide and a link pivotally connected at one of its ends to the slide and pivotally connected at its other end to the end of the arm so as to permit the end of the arm to rise and fall with respect to the slide as the squab is tilted with respect to the seat, the arrangement being such that, with the first locking means only released, tilting the squab forwardly over the seat moves the seat forwardly along said mounting means, and, with the second locking means only released, the seat with the squab locked thereto can be adjusted fore and aft on said mounting means.

2. A seat assembly as claimed in claim 1 wherein one side of the slide element has a series of notches spaced apart along the element, the fixed element has a notch adjacent the notched side of the slide element and said second locking means comprises a detent for engaging in a notch in the slide element and the registering notch in the fixed element to lock the slide element to the fixed element.

* * * * *